UNITED STATES PATENT OFFICE.

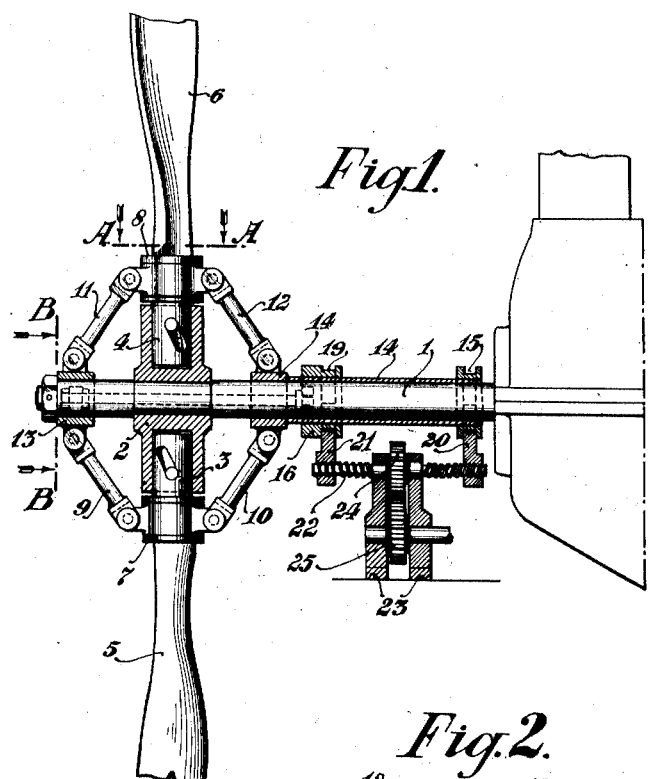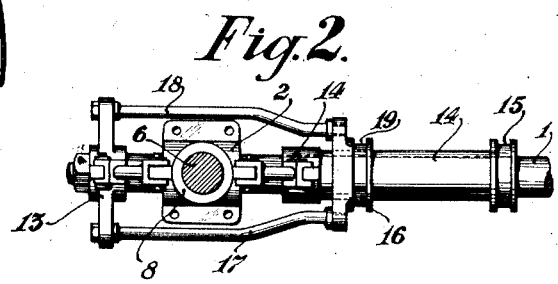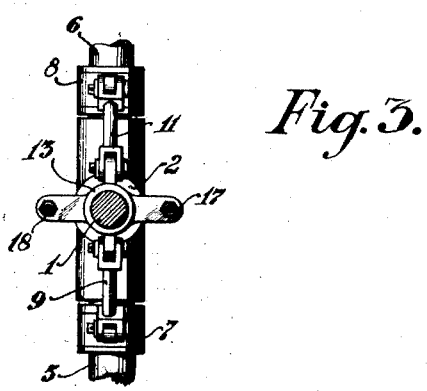

ARNO BOERNER, OF SCHEVENINGEN, NETHERLANDS.

PROPELLER FOR AIRCRAFT.

1,373,048. Specification of Letters Patent. Patented Mar. 29, 1921.

Application filed June 23, 1920. Serial No. 391,192.

*To all whom it may concern:*

Be it known that I, ARNO BOERNER, having no nationality, residing at Scheveningen, Netherlands, have invented certain new and useful Improvements in Propellers for Aircraft, of which the following is a specification.

This invention relates to propellers for aircraft of the kind in which the blades are adapted to slide radially to the propeller shaft and simultaneously to move angularly about an axis transverse to said shaft, whereby the resistance of the propeller can remain fixed at the amount required for an approximately uniform rotational speed of the engine under all conditions of atmospheric pressure.

The primary object of the invention is to provide a propeller of this kind having controlled regulation in which the regulating members are exposed to minimum disturbance by centrifugal force.

Devices of the kind to which invention relates are particularly useful in engines of recent construction wherein the engine is fed with compressed air so that its output can be kept constant independently of the elevation.

In order that the invention may be understood an embodiment thereof will now be described with reference to the accompanying drawings and by way of example only.

In these drawings Figure 1 illustrates a propeller with controlled regulation, in part elevation and part longitudinal section, Fig. 2, a section on the line A—A of Fig. 1, and Fig. 3, a section on the line B—B of Fig. 2.

On the shaft 1, which is driven by an engine, not shown, is secured the boss 2 of a propeller. The boss has two cylindrical chambers or sockets open at their outer ends for reception of the cylindrical inner ends or roots 3, 4 of the propeller blades 5, 6; the ends 3, 4 are so guided in said chambers that they may be displaced radially and simultaneously perform a slight angular movement.

Surrounding the blades 5, 6 are sleeves 7, 8 which are articulated by rods 9, 10, 11, 12 to bushes 13, 14. These bushes are slidably mounted on the shaft 1 at both sides of the boss 2, but are non-rotatable on the shaft 1. The bush 14 is of considerable length and is provided at the end remote from the propeller with an annular groove 15; slidable but non-rotatable on the bush 14 is a ring 16 which is rigidly coupled by means of rods 17, 18 with the bush 13 and which is formed with an annular groove 19.

Engaging the grooves 15, 19 are arms 20, 21 which are movable in parallelism with the shaft 1 in a guide not shown. Threaded in these arms are the ends of a spindle 22 having right and left hand screw threads, which spindle is mounted in a fixed bearing block 23 and can be rotated by means of gears 24, 25.

The operation of the described arrangement does not need to be further explained. When the spindle 22 is rotated in one direction or the other the arms 20, 21 and thereby the bushes 13, 14 are moved toward or away from one another and the blades 5, 6 are moved radially outward or inward whereby the diameter of the propeller is increased or diminished; at the same time the blades are moved angularly to a certain extent so that the pitch of the screw is correspondingly altered.

It will be remarked that owing to the provision of bushes and links on both sides of the plane of rotation of the propeller and adapted to remain always equidistant from said plane, the centrifugal forces on these members are balances and the regulation not liable to disturbance, which is important in view of the high speeds at which aircraft propellers revolve.

Having now particularly described and ascertained the nature of my said invention and in what manner the same is to be performed, I declare that what I claim is:—

1. In a propeller for aircraft, blades adapted to slide radially to the shaft of the propeller and simultaneously to move angularly about an axis transverse to said shaft, a boss on the shaft having sockets adapted to receive and guide the blades, bushes slidable on the shaft and disposed at both sides of the propeller, said bushes being movable equal distances from and toward one another, and jointed links connecting the blades to the bushes.

2. In a propeller according to claim 1, means for sliding the bushes comprising a rotatable spindle having right and left hand screw threads.

3. In a propeller according to claim 2, a ring slidable on one bush and provided with an annular groove, and arms connected with the screw-threaded spindle, one arm engaging the said annular grooves and the other arm engaging a similar groove on the other bush.

In testimony whereof I affix my signature.

ARNO BOERNER.